(12) United States Patent
Ronse

(10) Patent No.: US 12,017,625 B2
(45) Date of Patent: Jun. 25, 2024

(54) BRAKE WARE MONITORING

(71) Applicant: OVINTO CVBA, Aalter (BE)

(72) Inventor: Frederick Ronse, Knokke-Heist (BE)

(73) Assignee: OVINTO CVBA, Aalter (BE)

( * ) Notice: Subject to any disclaimer, the term of this patent is extended or adjusted under 35 U.S.C. 154(b) by 932 days.

(21) Appl. No.: 17/047,822

(22) PCT Filed: Apr. 17, 2019

(86) PCT No.: PCT/EP2019/059995
§ 371 (c)(1),
(2) Date: Oct. 15, 2020

(87) PCT Pub. No.: WO2019/202032
PCT Pub. Date: Oct. 24, 2019

(65) Prior Publication Data
US 2021/0114578 A1     Apr. 22, 2021

(30) Foreign Application Priority Data

Apr. 7, 2018 (EP) .................................... 18167713

(51) Int. Cl.
*B60T 17/22* (2006.01)
*B61H 1/00* (2006.01)
(Continued)

(52) U.S. Cl.
CPC ........ *B60T 17/228* (2013.01); *B61L 15/0081* (2013.01); *F16D 66/027* (2013.01);
(Continued)

(58) Field of Classification Search
CPC .. B60T 17/228; B61L 15/0081; F16D 66/027; B61H 1/00; B61H 13/00; B61H 15/0092
See application file for complete search history.

(56) References Cited

U.S. PATENT DOCUMENTS 4,432,229 A * 2/1984 Nowogrodzki ........... G01P 3/56
                                                        73/146
4,819,168 A * 4/1989 Laskey ................... B61C 15/14
                                                        701/19
(Continued)

FOREIGN PATENT DOCUMENTS

EP     0894994 A2    2/1999
EP     1148267 A2    10/2001
(Continued)

OTHER PUBLICATIONS

ISR/WO associated with parent application PCT/EP2019/059995 dated Jul. 1, 2019.

*Primary Examiner* — Robert A. Siconolfi
*Assistant Examiner* — James K Hsiao
(74) *Attorney, Agent, or Firm* — Vorys, Sater, Seymour and Pease, LLP

(57) ABSTRACT

The current invention relates to a method for monitoring a wear of a brake element (6) of a rail wagon (1) by means of a monitoring system (9, 4), said rail wagon (1) comprising a brake assembly (2) comprising said brake element (6), said brake assembly (2) further comprising a brake regulator device (7) comprising a first part (71) at a first end and a second part (72) at a second end for automatic adjusting of a clearance (13) with respect to said brake element (6), said clearance (13) relating to a braking of a wheel (3) of said rail wagon (1), said method comprising a plurality of steps.

17 Claims, 1 Drawing Sheet

(51) Int. Cl.
  *B61L 15/00* (2006.01)
  *F16D 66/02* (2006.01)
  *B61H 13/00* (2006.01)
  *B61H 15/00* (2006.01)

(52) U.S. Cl.
  CPC ............ *B61H 1/00* (2013.01); *B61H 13/00* (2013.01); *B61H 15/0092* (2013.01)

(56) References Cited

U.S. PATENT DOCUMENTS

| | | | |
|---|---|---|---|
| 6,006,868 | A | 12/1999 | Klink |
| 6,145,633 | A * | 11/2000 | Niederstadt ............ F16D 66/025 188/203 |
| 6,148,269 | A * | 11/2000 | Kumar ................... B60T 8/173 180/209 |
| 6,341,670 | B1 | 1/2002 | Leblanc et al. |
| 9,566,972 | B2 * | 2/2017 | Voigtmann ............. G01B 7/003 |
| 9,616,875 | B2 * | 4/2017 | Finch, Jr. ............. B60T 17/228 |
| 10,899,326 | B2 * | 1/2021 | Elstorpff ............... B60T 17/228 |
| 11,780,420 | B2 * | 10/2023 | Artru ................... B60T 13/665 303/20 |
| 2002/0195298 | A1 | 12/2002 | Borugian |
| 2014/0365046 | A1 * | 12/2014 | Madsen .................. B60L 15/38 701/19 |
| 2018/0170329 | A1 * | 6/2018 | Elstorpff ................ B60T 8/58 |

FOREIGN PATENT DOCUMENTS

| | | |
|---|---|---|
| EP | 1270983 A1 | 1/2003 |
| EP | 1798439 A1 | 6/2007 |
| EP | 2196378 B1 | 6/2010 |
| WO | 2015071783 A1 | 5/2015 |
| WO | 2016040430 A1 | 3/2016 |
| WO | 2019202032 A1 | 10/2019 |

* cited by examiner

BRAKE WARE MONITORING

TECHNICAL FIELD

The invention pertains to the technical field of brakes for vehicles such as rail wagons.

BACKGROUND

In the sphere of brake monitoring systems applied to mobile vehicles both for road transport and for rail transport or other applications, use is made of brake wear detectors that warn when the thickness of the friction element has reached a level that is considered critical and it therefore becomes necessary to change the friction element in order to assure a perfect operation of the transport vehicle.

Many prior art devices envisage the addition of a conductor wire embedded in the interior of the friction material which is included there during the manufacturing process of the brake shoe or pad. A connector is provided at the end of the conductor wire; upon installation on the vehicle, the connector is used for making connection to further portions of the brake monitoring system by means of a cable.

Other prior art devices permit fitting to brake shoes or pads prior to their installation on the vehicle, without the system having to be incorporated during the manufacture of the friction material. Also, these systems are provided with a connector; upon installation on the vehicle, the connector is used for making connection to further portions of the brake monitoring system by means of a cable. Some of these prior art systems are adapted so that the wear on the friction material causes the device to come into contact with the brake disc or drum, which is when the circuit between the device and the brake disc or drum is closed.

EP 1 798 439 discloses a wear detector for brake shoes or pads that permits fitting to brake shoes or pads prior to installation. The wear detector gives notice of wear when the electrical circuit of the device is closed. The wear detector comprises a long, preferably-T-shaped body. The two opposing arms of the body are connected in a groove that is provided in the friction material of the brake shoe or pad, while the central portion thereof forms the element that comes into contact with the brake disc when the friction material of the associated shoe or pad is worn.

EP 1 270 983 discloses a wear sensor with the addition of a conductor wire embedded in the interior of the friction material which is included there during the manufacturing process of the brake shoe or pad. The wear sensor gives notice of wear when the electrical circuit of the device is open. The wear sensor is operable to detect wear of the braking member in service. The wear sensor comprises a sensor head mounted so that a wear surface of the sensor head is substantially flush with the engagement surface of the braking member and engages the braked member when said engagement surface does so that said engagement and wear surfaces are subject to substantially equal wear.

A problem with devices according to both EP 1 798 439 and EP 1 270 983 is that they are complicated in use and installation, as described further in this document.

Further related concepts are found in U.S. Pat. No. 6,360,850 and EP 1 148 267. They suffer the same problems as EP 1 798 439 and EP 1 270 983, and further have the problem that they do not relate to railway transport and are not adapted to brakes for cargo wagons.

U.S. Pat. No. 6,006,868 discloses methods and systems for monitoring a hand brake, but lacks means for monitoring brake wear.

U.S. Pat. No. 6,341,670 discloses a system for monitoring brake wear for a vehicle with at least one drum brake system with a push rod and an air drum bolt. U.S. Pat. No. 6,341,670 is intended for drum brakes of trucks, and is not suitable for monitoring rail vehicle brake wear.

US 2002/0195298 describes a method wherein the distance from a brake lining block to an inner surface of a brake drum is measured, with the aid of a position sensor. US 2002/0195298 is however complex in use, and is adapted for vehicles with a vehicle cab, lacking means for application to train wagons.

WO 2016/040430 discloses a piston stroke sensor arrangement for a brake unit including a brake unit including a piston and a piston tube, and a proximity sensor supported on the brake unit. The proximity sensor may determine the location of the piston within the brake unit based on the position of the piston tube relative to the proximity sensor. The problem with WO 2016/040430 is that the concept is suitable for application only to the specific set-up of a piston and a piston tube.

There remains a need in the art for an improved monitoring of brake wear. The present invention aims to resolve at least some of the problems mentioned above.

SUMMARY OF THE INVENTION

In a first aspect, the present invention provides a method according to claim 1.

The advantage of such a method lies in the advantageous monitoring at the level of the brake regulator device. Such a monitoring allows working with regular brake elements without brake wear detection electronics attached or embedded, and hence cheaper brake elements. Moreover, a brake regulator device typically controls more than one brake element, leading to higher monitoring efficiency, with a single monitoring operation performed for potentially multiple brake elements at once. Furthermore, since brake elements are to be replaced on a regular basis due to wear, bringing down the cost of brake elements by moving the monitoring to the brake regulator device and away from the brake elements further reduces cost.

Another advantage lies in the long lifecycle of present day brake regulator devices, allowing a long period of monitoring without requiring physical recalibration or repositioning of monitoring system components, which leads to enhanced user-friendliness. Furthermore, as known to one skilled in the art, the wear of the brake elements typically creates particles, e.g. dust, and heat built-up. By not performing monitoring in the immediate vicinity of the brake elements, the monitoring may be performed more robust, with less risk of monitoring errors due to contamination by particles or premature failure due to excessive heating. Yet another benefit of the present invention lies in the direct monitoring of the brake regulator device. This allows to detect when the brake regulator device is operating beyond the extension range for which it is designed. This may e.g. be the case if the current wheel diameter is excessively low, and the brake regulator device is extended beyond its maximum extension distance, leading to danger in operation. This contrasts with e.g. direct monitoring of the clearance between brake elements and wheels, which does not allow to detect whether the brake regulator device is within its extension range.

Another advantage of the present invention is that no cables are running to or from the brake elements. Furthermore, the detector may be very compact. This ensures that the brake mechanism is not hampered in any way by the monitoring system. This is beneficial for overall safety and ease of installation.

Yet another advantage lies in the advantageous combination of the present invention with wheel-related monitoring systems such as those disclosed in EP 2 808 223, since the monitoring of brake wear may be further improved by preferably taking into account wheel-related data, more preferably by taking into account the current wheel diameter. Particularly, a monitoring system keeping track of wheels or axles of a rail wagon may keep track of the current wheel diameter and/or the wheel diameter as last measured on the wheel. The wheel diameter as measured may thereby relate to the wheel diameter as installed and/or to the wheel diameter measured after a maintenance operation. The current wheel diameter may be taken to be equal to the wheel diameter as measured but may preferably be calculated based on the current travelled mileage of said wheel or its axle as it is tracked, as e.g. disclosed in EP 2 808 223.

In a second aspect, the present invention provides a monitoring system according to claim 15.

In a third aspect, the invention offers a rail wagon according to claim 16.

In a fourth aspect, the invention provides a use according to claim 17.

In a fifth aspect, the invention offers a kit according to claim 18.

The advantages of the system, the rail wagon, the use and the kit are similar to those of the method of the present invention.

Further preferred embodiments and their advantages are disclosed in the detailed description and the dependent claims.

DETAILED DESCRIPTION OF THE INVENTION

Figure 1:
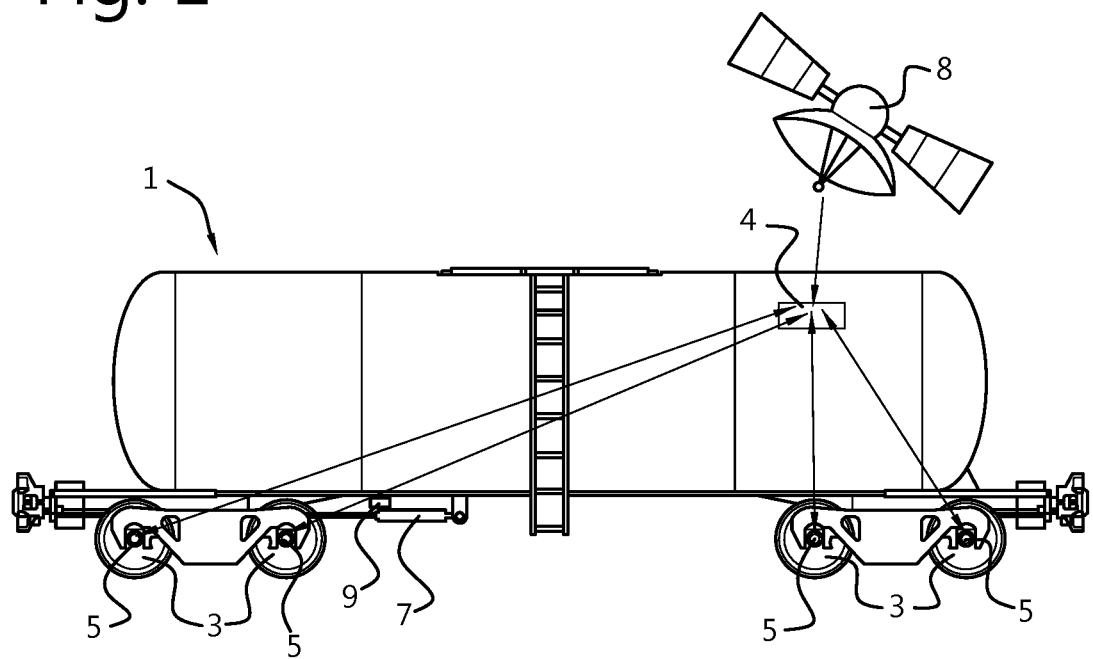
FIG. 1 shows an example cargo wagon relating to the present invention.

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

Furthermore, the terms first, second, third and the like in the description and in the claims, are used for distinguishing between similar elements and not necessarily for describing a sequential or chronological order, unless specified. It is to be understood that the terms so used are interchangeable under appropriate circumstances and that the embodiments of the invention described herein are capable of operation in other sequences than described or illustrated herein.

The recitation of numerical ranges by endpoints includes all numbers and fractions subsumed within that range, as well as the recited endpoints.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any ≥3, ≥4, ≥5, ≥6 or ≥7 etc. of said members, and up to all said members.

All references cited in the present specification are hereby incorporated by reference in their entirety. In particular, the teachings of all references herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention. The terms or definitions used herein are provided solely to aid in the understanding of the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In this document, the term "brake regulator device" refers to a device for automatic adjustment of the clearance between brake elements and wheels. A "slack adjuster" or, equivalently, "brake slack adjuster" is an example of such a brake regulator device.

The brake regulator device forms the bridge between the wear-resistant brake elements, preferably brake blocks, and the actuator and the overall mechanical control of the brake. This mechanical control can for instance comprise a brake rigging, a piston and a brake cylinder and can be actuated with compressed air, but may in fact be actuated by any means.

The brake regulator device contributes to the correct operation of the brake by absorbing the wear level of the brake elements, so that an equal force coming from the mechanical control results in a corresponding braking effect on the impact surface relating to the wheels, irrespective of the wear level of the brake elements. Characteristic hereby is that the brake regulator comprises a first part at one end and a second part at the other end which move further apart as the brake elements exhibit more wear. In a preferred embodiment, the first part and second part mate in a sliding fit, more preferably a telescopically sliding fit.

In a first aspect the invention relates to a method for monitoring a wear of a brake element, preferably the brake element of a rail wagon, by means of a monitoring system. Preferably, the rail wagon comprises a brake assembly comprising the brake element. Preferably, the brake assembly further comprises a brake regulator device comprising a first part at a first end and a second part at a second end. Preferably, the brake assembly is configured for automatic adjustment of a clearance with respect to said brake element, said clearance relating to a braking of a wheel. Preferably, the method comprises the step of measuring, by said monitoring system, of a dislocation of said first part with respect to said second part of said brake regulator device during said braking, for determining a current extension distance of said brake regulator device. Preferably, the method further comprises comparing, by said monitoring system, of said measured dislocation to a predetermined dislocation, for determining an extension difference. Preferably, the method further comprises the steps of:

calculating a change in the wheel diameter of said wheel and/or directly or indirectly retrieving a change of the wheel diameter from an internal memory comprised in said monitoring system or from an external memory, whereby the external memory is accessible by said monitoring system; and evaluating by said monitoring system said wear of said brake element based on said extension difference and said change in the wheel diameter of said wheel.

The monitoring system can access the external memory through a wireless connection or network, such as, but not limited to, satellite communication, infrared communication, microwave communication, Bluetooth, mobile communication systems or Wi-Fi.

The invention provides better monitoring of the wear level by monitoring the extent to which the first and second part of the brake regulator device move further apart. This may relate to a monitoring of a dislocation of the first part with respect to the second part.

When monitoring the wear of a brake element it is important to also take the wear of the wheel into account. The change of the dislocation between the first and the second part does not depend only on the wear of the brake element, but also on the wear of the wheel. Therefore, linking the change of the dislocation only to the wear of the brake element will not give a correct indication of the wear of the brake element. By incorporating the change in the wheel diameter, which represents the wear of a wheel, a more accurate estimation of the wear of the brake can be given. Hereby, unnecessary or wrong maintenance services can be avoided. Of particular note is the fact that certain events can create a notable change in wheel diameter, which in the past could not be accounted for by passive measurements, only by actual inspection. Such events are for instance high-intensity brake maneuvers. Especially in brake events where the wheel continues to slide along the rail in a locked position (so-called "wheel flat"), thereby chafing of part of its mantle at a fixed position, this warrants immediate regrinding of the wheel to a (more) perfectly circular form, which of course severely impacts the diameter of the wheel. After grinding, the new diameter is preferably stored in a central database which can be consulted remotely by the monitoring system. Another event is the routine maintenance, which comprises regrinding of the wheels, typically every 600 000 km or every 12 years, whichever comes first. Again, the new diameter is stored in the database. Note that the diameter can be estimated to an even better approximation of the actual diameter, by taking into account the distance travelled since the last measurement of the wheel (and optionally more details, such as load during the distance travelled, trajectory, state of rails, etc.) and an estimated wear on the wheels over said distance. Note that preferably, the diameter of the wheels is updated more frequently than every 12 years or 600 000 km as this would give a more accurate estimate.

In many cases, and particularly in a preferred embodiment wherein the braking of the wheel relates to the pressing of the braking elements against the wheels, more preferably against the rolling surface of the wheel, the brake regulator in fact contributes to the correct operation of the brake also by absorbing the wear level of the wheel. It does so by ensuring that an equal force coming from the mechanical control results in a corresponding braking effect on the wheel, and this, as long as the maximum extension is not reached, irrespective of the wear level of the wheel and irrespective of the current wheel diameter. Therefore, in a preferred embodiment, the current diameter of the wheel is also taken into account, since this may impact the distance between the brake element and the impact surface relating to the wheel, preferably the distance between the brake element and the wheel, and therefore also the braking effect at the level of the brake regulator device.

The wheel is subject to wear at the level of its rolling surface, as a result of which the wheel diameter slowly decreases during use. Moreover, it is important for the correct operation that the rolling surface is substantially cylindrical and remains the same. For example, it is common for this surface to be ground off during maintenance in order to maintain a substantially cylindrical shape for this surface.

The precise reduction in diameter during maintenance depends on the maintenance. A maintenance is typically triggered by one of the following criteria:

The wheel (or axle) has exceeded a predetermined total working distance since the last maintenance, e.g. 600 000 km.

The wheel (or axle) is a predetermined period of time in use since the last maintenance, e.g. 12 years.

The wheel (or axle) was involved in an incident that may have caused damage, such as a "wheel flat" after hard braking.

It is sufficient that one criterion is met to trigger a maintenance. A maintenance triggered by usage distance or duration is typically accompanied by a limited to average degree of wheel surface reduction, and a corresponding reduction of the wheel diameter. However, maintenance triggered by an incident is often accompanied by a larger reduction of the wheel diameter. A typical (maximum) wheel diameter when commissioned is 923 mm. The grinding is only permitted up to a certain fixed minimum wheel diameter, e.g. 840 mm. This implies a large variation in wheel diameters in practice, with a difference of 83 mm between the extremities of 840 mm and 923 mm.

When replacing worn brake elements with new brake elements, the aforementioned wear of the wheels must also be taken into account. The brake regulator must compensate for the altered mutual distance between the wear-resistant contact surface of the brake element and the wear-resistant surface of the wheel. This is in contrast to the concept for monitoring, which is primarily aimed at the wear of the brake elements, and thus at the thickness of the brake elements. As a second dimension, the current wheel diameter is important. This wheel diameter can be known directly. In a preferred embodiment of the concept, the current wheel diameter is therefore explicitly known. Preferably, this value is updated after each maintenance of the wheels. In a further preferred embodiment this value is advantageously maintained by a system for monitoring wheels and/or axes, such as the system described in EP 3 003 820.

In light of the above, the applicant acknowledges multiple possibilities for taking into account an (approximated) actual wheel diameter in determining the wear of the brake elements, whereby several of the possibilities may be combinable for the monitoring system to receive the wheel diameter. In a particular embodiment, use is made of a system for monitoring wheels, which can store wheel diameters and link these to the corresponding wheel, while allowing remote access to the database. The monitoring system is adapted to identify the wheels that are subject to braking by the monitored brake elements (for instance, an RFID tag on the wheel or axle, or a database where the wheels associated to rail wagons are stored), and can use this identification to obtain the wheel diameter from the database.

In a preferred embodiment the calculation of the change in the wheel diameter of said wheel comprises one or a combination of the following steps:
registering, by said monitoring system, a current distance travelled by said wheel, whereby the current distance travelled is the distance travelled by the said wheel since the last registration or measurement of the wheel diameter of said wheel;
retrieving from said monitoring system or from an external database, accessible by said monitoring system, a predetermined diameter of said wheel, whereby the predetermined diameter of said wheel is the last registered or measured diameter of said wheel;
calculating, by said monitoring system, the current diameter of said wheel, wherein the current diameter is calculated based on the current distance travelled of said wheel and the predetermined diameter of said wheel;
calculating, by said monitoring system, the change in the wheel diameter of said wheel, through the combination of the current wheel diameter and the predetermined wheel diameter.

The combination of all four steps is especially advantageous for the correct determination of the wear of the brake element.

The monitoring system may, but does not have to, comprise a distance monitoring system for monitoring the distance travelled by said wheel. The distance monitoring system can be a global positioning system tracker.

In a preferred embodiment the combination of the current wheel diameter and the predetermined wheel diameter comprises the subtraction of the current wheel diameter from the predetermined wheel diameter.

The applicant has noticed that the subtraction of the current wheel diameter and the predetermined wheel diameter allows for an easy and extremely accurate method to calculate the change in the wheel diameter.

In a preferred embodiment the internal memory is configured for saving and/or storing all registered or measured wheel diameters of said wheel.

Communication to an external memory could cause a delay in the determination of the wear of the brake element. Having all registered or measured wheel diameters of said wheel on the internal memory, allows to eliminate as much intermediate steps as possible, assuring for a faster and more accurate determination of the wear of the brake element.

In a preferred embodiment the predetermined dislocation is the dislocation during braking under a known wheel diameter for said wheel, and under a known wear of the brake element or a brake element of said type.

In an even more preferred embodiment, the predetermined dislocation is the dislocation during braking under the maximal diameter for said wheel, and under the minimal wear of the brake element or a brake element of said type.

Using the braking conditions from a known wheel diameter and a known wear of the brake element as a reference point results in a more accurate wear calculation. By employing the predetermined dislocation under maximal diameter and minimal wear of the brake element as a reference point, the accuracy is improved even more.

In a preferred embodiment the change in the wheel diameter of said wheel is determined based on the combination of the known wheel diameter and current wheel diameter of said wheel.

In a preferred embodiment the monitoring system is adapted to alert that a wear level relating to said wear exceeds a predetermined maximum wear level. Preferably, said monitoring system is adapted to remotely alert via a satellite communication network that said wear level relating to said wear exceeds said predetermined maximum wear level.

This system is advantageous for ensuring that the brake element is replaced when it's needed, and as such ensuring optimal safety, while eliminating unnecessary maintenance breaks.

In a preferred embodiment the monitoring system comprises a sensing module mounted at least partly on said brake regulator device. Preferably, the sensing module is configured for reliably determining a current extension distance of said brake regulator device. Preferably, said monitoring system comprises a monitoring module. Preferably, the monitoring module is configured for communicating with said sensing module. Preferably, said communicating comprises at least a sending of said measured dislocation from said sensing module to said monitoring module, and wherein more preferably said sensing module and said monitoring module are configured for performing said communicating wirelessly.

In a preferred embodiment, the brake controller is monitored by means of a potentiometer mounted on the brake controller. This leads to a simple and robust implementation, with very reliable and water-resistant potentiometers available on the market. This also allows very limited power usage for the monitoring system. In an alternative embodiment, the brake controller is monitored by means of a reed switch combined with one or two magnets, or alternatively a pair of reed switches combined with a single magnet. This also allows very limited power usage for the monitoring system, and furthermore allows avoiding direct mechanical contact between magnet and reed switch, reducing the risk of interfering with the operation of the brake.

In a preferred embodiment said sensing module comprises a first pair of detector elements. Preferably, the first pair of detector elements comprise a first and a second detector element. Preferably, said sensing module further comprises a second pair of detector elements. Preferably, the second pair of detector elements comprise said second detector element and a third detector element. Preferably, said measuring of said dislocation of said first part with respect to said second part involves determining whether said first and said second detector element are within each other's range. Preferably, said measuring of said dislocation of said first part with respect to said second part further involves whether said second and said third detector element are within each other's range. Preferably, a first member of each pair comprises a reed switch. Preferably, a second member of each pair comprises a magnet. Preferably, said determining whether said first and second detector element are within each other's range, and, more preferably, said determining whether said second and said third detector element are within each other's range, involves evaluation a magnetization of said reed switch due to the proximity of said magnet, thereby measuring said dislocation for determining said current extension distance of said brake regulator device.

In an alternative embodiment a first member of each pair comprises an optical detector. Preferably, a second member of each pair comprises an optically-detectable tag. Preferably, said determining whether said first and second detector element are within each other's range, and, more preferably, said determining whether said second and said third detector element are within each other's range, involves evaluating a visibility of said optically-detectable tag by said optical detector, thereby measuring said dislocation for determining said current extension distance of said brake regulator device.

In a preferred embodiment said brake regulator device is a slack adjuster. Preferably, said brake regulator device is a hydraulic slack adjuster.

The invention may relate to the brake element being a brake block, a brake shoe or a brake pad. In a preferred embodiment the brake element is a brake block or brake shoe suitable for pressing against the wheel or against a brake drum. In a related embodiment, the brake block or brake shoe belongs to a drum brake system, whereby the brake block or brake shoe is pressed against a brake drum or against the wheel. In an alternative embodiment, the brake element is a brake pad, the brake pad preferably belonging to a disc brake system, whereby the brake pad is pressed against a brake disc. In different embodiments of the present invention, the brake element may relate to any kind of friction-based braking.

In a preferred embodiment, said rail wagon concerns an unpowered cargo wagon.

In another preferred embodiment, said monitoring system and/or said monitoring module and/or said sensing module comprises a battery or equivalent power source such as an energy harvesting power module. This is advantageous because it further enhances modularity and autonomy, which is particularly useful when the cargo wagon is unpowered. Energy harvesting may contribute partly to or may even constitute power supply, and may be based on motion energy and/or solar energy and/or wind energy.

In a preferred embodiment, transfer of data is performed wirelessly. This allows data to be read out from any side of the rail wagon. In a preferred embodiment, this data may be read externally. For instance, an operator inspecting the brake elements may be standing next to the rail wagon and receive a notice from there. Another example may be a receiver that is installed near parked rail wagons. In such a case, a monitoring system according to the present invention enables that the wear of the brakes is automatically "audited" while the rail wagon is parked. In a system according to the prior art, such "auditing" would require a wired connection or a much more complicated system.

In a preferred embodiment, the monitoring system comprises a satellite communication module adapted to send an alert to a remote location, said alert comprising an alert and/or an alarm and/or a notice and/or a status and/or an identification of the rail wagon. This is advantageous for maintenance planning as well as for timely monitoring of safety risks.

In a preferred embodiment, said monitoring system further comprises a satellite positioning module, whereby said alert comprises a position of said cargo wagon. The satellite positioning may be based on any Global Navigation Satellite System (GNSS), such as GPS, GLONASS, Galileo or Beidou. This is advantageous because it allows identifying where a maintenance operation is to be executed.

In a preferred embodiment, said cargo wagon is an unpowered cargo wagon, and said monitoring system is mounted entirely on said unpowered cargo wagon. This is advantageous because it provides a wagon without electronic maintenance means with an adequate and autonomous solution.

In another preferred embodiment, said monitoring system comprises a mobile device, said mobile device comprising at least the monitoring module of said monitoring system, the mobile device preferably further comprising at least one of the following modules of said monitoring system: the satellite communication module, the satellite positioning module. This is advantageous because it allows an operator to manually or automatically inspect the state of the brakes by means of a mobile device, preferably a hand-held mobile device.

In another preferred embodiment, the monitoring system comprises a logging module that stores information with respect to the wear of the brake elements over time. This allows to keep a full log of historical information, which is advantageous because it enhances maintenance.

In a preferred embodiment said brake assembly is actuated by an actuator. Preferably, the actuator comprises a brake cylinder and a piston. Preferably, said actuation is based on compressed air. Preferably, said brake assembly further comprises a brake rigging. Preferably, said brake rigging is configured for connecting said actuator to said brake regulator device.

In a second aspect the invention relates to a monitoring system configured for monitoring a wear of a brake element. Preferably, the monitoring system is configured for monitoring a wear of a brake element of a rail wagon. Preferably, said brake element in a component of a brake assembly. Preferably, the brake assembly further comprises a brake regulator device. Preferably, the brake regulator device comprises a first part at a first end. Preferably, the brake regulator device further comprises a second part at a second end. Preferably, the brake regulator device is configured for automatic adjustment of a clearance with respect to said brake element, said clearance relating to a braking of a wheel of said rail wagon.

Preferably, the monitoring system comprises a sensing module. Preferably, the sensing module is configured for measuring a dislocation of said first part with respect to said second part of said brake regulator device during said braking for determining a current extension distance of said brake regulator device. Preferably, said sensing module is adapted for being mounted at least partly on said brake regulator device. Preferably, the monitoring system comprises means configured for comparing said measured dislocation to said predetermined dislocation for determining an extension difference, said means configured for said comparing preferably comprised in a monitoring module comprised in said monitoring system. Preferably, the monitoring system comprises means configured for calculating a change in the wheel diameter of said wheel and/or retrieving the change of the wheel diameter from an internal memory comprised in said monitoring system or from an external memory, whereby the external memory is accessible by said monitoring system. Preferably, the monitoring system comprises means configured for evaluating, based on said extension difference and said change in the wheel diameter of said wheel, said wear of said brake element, and wherein preferably the evaluation of said wear of said brake element takes place in said monitoring module, comprised in said monitoring system.

In a preferred embodiment the predetermined dislocation is the dislocation during braking under a known wheel diameter for said wheel, and under a known wear of the brake element or a brake element of said type.

In an even more preferred embodiment the predetermined dislocation is the dislocation during braking under the maximal diameter for said wheel, and under the minimal wear of the brake element or a brake element of said type.

The invention is further described by the following non-limiting example which further illustrates the invention, and is not intended to, nor should they be interpreted to, limit the scope of the invention.

EXAMPLE

Figure 2:
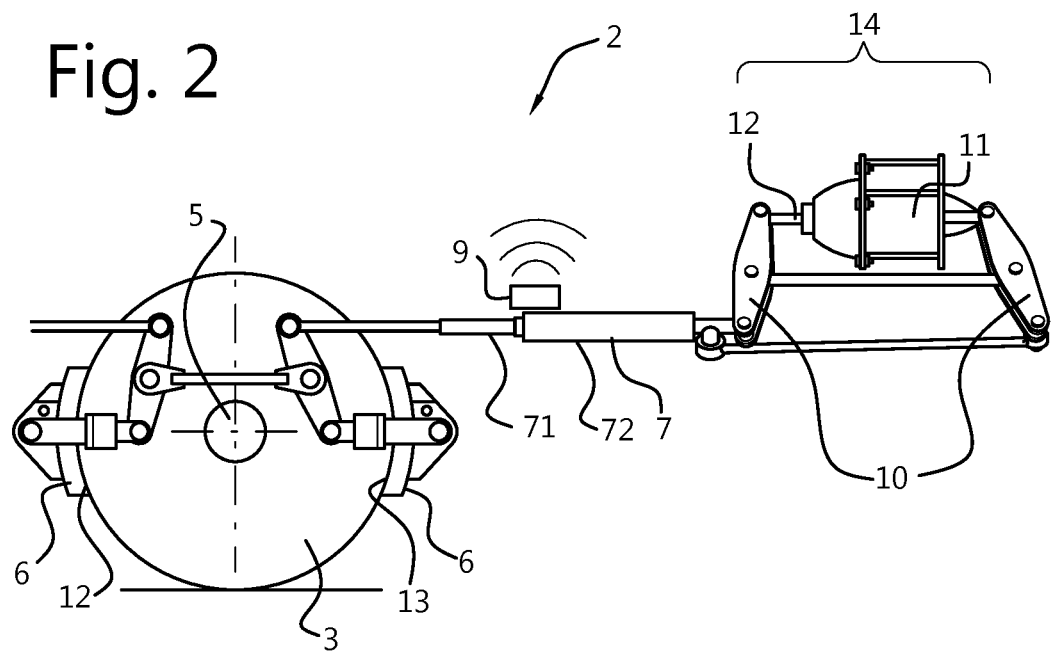
FIG. 2 shows an example brake assembly relating to the present invention.

FIG. 1 shows an example rail wagon (1), with a monitoring system (9, 4) according to the invention, wherein the wear of a brake element (6) of the rail wagon, i.e. an unpowered cargo wagon (1) is monitored. FIG. 2 shows the example brake assembly (2) of this cargo wagon (1).

The rail wagon (1) comprises the brake assembly (2) comprising said brake element (6), said brake assembly (2) further comprising a brake regulator device (7) comprising a first part (71) at a first end and a second part (72) at a second end for automatic adjusting of a clearance (13) with respect to said brake element (6), said clearance (13) relating to a braking of a wheel (3) of said rail wagon (1).

The monitoring system comprises a monitoring module (4) configured for communicating with a communication satellite (8) belonging to a communication network as well as communicating with the sensing module (9) mounted on the brake regulator device (7). Particularly, the monitoring module (9) is configured for
- wirelessly communicating with said sensing module (9) for receiving said measured dislocation,
- comparing said measured dislocation to said predetermined dislocation for determining an extension difference,
- calculating a current wheel diameter of said wheel (3) and/or retrieving said current wheel diameter from a memory comprised in said monitoring module (4);
- evaluating said wear of said brake element (6) based on said extension difference and preferably further based on said current wheel diameter of said wheel (3).

Furthermore, in this example, the monitoring module (4) is also configured monitoring one or more axles (5) situated beneath an unpowered transport unit (2), such as a cargo or a tank unit, with axle monitoring as disclosed in EP 2 808 223. One axle (5) forms one entity together with a pair of stand-alone wheels (3) placed at both ends of the respective axle (5).

The sensing module (9) is configured for measuring a dislocation of said first part (71) with respect to said second part (72) of said brake regulator device (7) during said braking for determining a current extension distance of said brake regulator device (7). Said sensing module (9) is mounted at least partly on said brake regulator device (7).

The sensing module (9) comprises a potentiometer for said measuring of said dislocation of said first part (71) with respect to said second part (72), preferably wherein said potentiometer comprises a slider contact and a slide-contact-receiving resistance wire; wherein preferably said slider contact is adapted to move along with one of said first (71) and said second (72) part while said slide-contact-receiving resistance wire is adapted to move along with the other of said first (71) and said second (72) part.

The brake regulator device (7) is a hydraulic slack adjuster.

The brake element (6) is a brake block. Said automatic adjusting of said clearance (13) by said brake regulator device (7) relates to the clearance (13) between said brake element (6) and said wheel (3).

The brake assembly (2) is actuated by an actuator (14) comprising a brake cylinder (11) and a piston (12). The actuation is based on compressed air. The brake assembly (2) further comprises a brake rigging (10) for connecting said actuator (14) to said brake regulator device (7).

It is supposed that the present invention is not restricted to any form of realization described previously and that some modifications can be added to the presented example of fabrication without reappraisal of the appended claims. For example, the present invention has been described referring to rail wagons, but it is clear that the invention can be applied to other vehicles such as passenger trains, metro wagons, cars, buses, trucks, bikes, motorcycles and any other vehicle using brakes with a brake regulator device and brake elements such as brake blocks, brake pads or brake shoes.

The invention claimed is:

1. A method for monitoring a wear of a brake element of a rail wagon by means of a monitoring system, said rail wagon comprising a brake assembly comprising said brake element, said brake assembly further comprising a brake regulator device comprising a first part at a first end and a second part at a second end for automatic adjusting of a clearance with respect to said brake element, said clearance relating to a braking of a wheel of said rail wagon, said method comprising the steps of:
   measuring, by said monitoring system, of a dislocation of said first part with respect to said second part of said brake regulator device during said braking, for determining a current extension distance of said brake regulator device;
   comparing, by said monitoring system, of said measured dislocation to a predetermined dislocation, for determining an extension difference,
   calculating a change in the wheel diameter of said wheel or directly or indirectly retrieving a change of the wheel diameter from an internal memory comprised in said monitoring system or from an external memory, whereby the external memory is accessible by said monitoring system;
   evaluating by said monitoring system said wear of said brake element based on said extension difference and said change in the wheel diameter of said wheel, wherein the monitoring system is adapted to alert that a wear level relating to said wear exceeds a predetermined maximum wear level.

2. Method according to claim 1, wherein the change in the wheel diameter of said wheel is calculated and wherein the calculation of the change in the wheel diameter of said wheel comprises the steps of:
   registering, by said monitoring system, a current distance travelled by said wheel, whereby the current distance travelled is the distance travelled by the said wheel since the last registration or measurement of the wheel diameter of said wheel;

retrieving from said monitoring system or from an external database, accessible by said monitoring system, a predetermined diameter of said wheel, whereby the predetermined diameter of said wheel is the last registered or measured diameter of said wheel;

calculating, by said monitoring system, a current diameter of said wheel, wherein the current diameter is calculated based on the current distance travelled of said wheel and the predetermined diameter of said wheel;

calculating, by said monitoring system, a change in the wheel diameter of said wheel, through the combination of the current wheel diameter and the predetermined wheel diameter.

3. Method according to claim 2, wherein the combination of the current wheel diameter and the predetermined wheel diameter comprises the subtraction of the current wheel diameter from the predetermined wheel diameter.

4. Method according to claim 1, wherein the internal memory is configured for saving or storing all registered or measured wheel diameters of said wheel.

5. Method according to claim 1, wherein the predetermined dislocation is the dislocation during braking under a known wheel diameter for said wheel, and under a known wear of the brake element or a brake element of a type.

6. Method according to claim 5, whereby the change in the wheel diameter of said wheel is determined based on a combination of the known wheel diameter and current wheel diameter of said wheel.

7. Method according to claim 1, wherein said monitoring system is adapted to remotely alert via a satellite communication network that said wear level relating to said wear exceeds said predetermined maximum wear level.

8. Method according to claim 1, wherein said monitoring system comprises a sensing module mounted at least partly on said brake regulator device for reliably determining a current extension distance of said brake regulator device.

9. Method according to claim 8, wherein said sensing module comprises a potentiometer for said measuring of said dislocation of said first part with respect to said second part.

10. Method according to claim 1, wherein said sensing module comprises a first pair of detector elements comprising a first and second detector element; wherein said measuring of said dislocation of said first part with respect to said second part involves determining whether said first and said second detector element are within each other's range; wherein a first member of each pair comprises a reed switch and wherein a second member of each pair comprises a magnet; wherein said determining whether said first and second detector element are within each other's range, involves evaluation a magnetization of said reed switch due to the proximity of said magnet, thereby measuring said dislocation for determining said current extension distance of said brake regulator device.

11. Method according to claim 8, wherein said sensing module comprises a first pair of detector elements comprising a first and second detector element; wherein said measuring of said dislocation of said first part with respect to said second part involves determining whether said first and said second detector element are within each other's range; wherein a first member of each pair comprises an optical detector and wherein a second member of each pair comprises an optically-detectable tag; wherein said determining whether said first and second detector element are within each other's range, involves evaluating a visibility of said optically-detectable tag by said optical detector, thereby measuring said dislocation for determining said current extension distance of said brake regulator device.

12. Method according to claim 1, wherein said brake regulator device is a slack adjuster.

13. Method according to claim 1, wherein said brake element is a brake block, a brake shoe or a brake pad; and wherein said automatic adjusting of said clearance by said brake regulator device relates to the clearance between said brake element and said wheel.

14. Method according to claim 1, wherein said brake assembly is actuated by an actuator comprising a brake cylinder and a piston.

15. A monitoring system for monitoring a wear of a brake element of a rail wagon, said rail wagon comprising
a brake assembly comprising said brake element,
said brake assembly comprising a brake regulator device comprising a first part at a first end and a second part at a second end for automatic adjusting of a clearance with respect to said brake element, said clearance relating to a braking of a wheel of said rail wagon,
said monitoring system comprising
a sensing module configured for measuring a dislocation of said first part with respect to said second part of said brake regulator device during said braking for determining a current extension distance of said brake regulator device;
means configured for comparing said measured dislocation to said predetermined dislocation for determining an extension difference;
means configured for calculating a change in the wheel diameter of said wheel or retrieving the change of the wheel diameter from an internal memory comprised in said monitoring system or from an external memory, whereby the external memory is accessible by said monitoring system;
means configured for evaluating, based on said extension difference and said change in the wheel diameter of said wheel, said wear of said brake element,
wherein the monitoring system is adapted to alert that a wear level relating to said wear exceeds a predetermined maximum wear level.

16. The monitoring system of claim 15, wherein the monitoring system monitors a wear of each of the brake elements of said rail wagon.

17. A kit for monitoring a wear of a brake element of a rail wagon; said rail wagon comprising a brake assembly comprising said brake element, said brake assembly further comprising a brake regulator device comprising a first part at a first end and a second part at a second end for automatic adjusting of a clearance with respect to said brake element, said clearance relating to a braking of a wheel of said rail wagon, said kit comprising
a sensing module configured for
measuring a dislocation of said first part with respect to said second part of said brake regulator device during said braking for determining a current extension distance of said brake regulator device;
communicating said measured dislocation to a receiver,
a monitoring module configured for
communicating with said sensing module for receiving said measured dislocation,
comparing said measured dislocation to said predetermined dislocation for determining an extension difference, calculating a change in the wheel diameter of said wheel or retrieving the change of the wheel diameter from an internal memory comprised in said monitoring module or from an external memory, whereby the external memory is accessible by said monitoring module;

evaluating said wear of said brake element based on said extension difference, wherein the monitoring module is adapted to alert that a wear level relating to said wear exceeds a predetermined maximum wear level.

\* \* \* \* \*